United States Patent
Whyte et al.

(10) Patent No.: US 8,250,335 B2
(45) Date of Patent: Aug. 21, 2012

(54) METHOD, SYSTEM AND COMPUTER PROGRAM PRODUCT FOR MANAGING THE STORAGE OF DATA

(75) Inventors: Barry D. Whyte, Eastleigh (GB); Geoff Lane, Southampton (GB); Simon Walsh, Hayling Island (GB)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 12/128,388

(22) Filed: May 28, 2008

(65) Prior Publication Data

US 2008/0307191 A1 Dec. 11, 2008

(30) Foreign Application Priority Data

Jun. 7, 2007 (EP) .................................. 07109814.9

(51) Int. Cl.
*G06F 12/00* (2006.01)

(52) U.S. Cl. ........ 711/209; 711/114; 711/161; 711/176; 711/203; 711/205

(58) Field of Classification Search .................. None
See application file for complete search history.

(56) References Cited

U.S. PATENT DOCUMENTS 6,968,424 B1* 11/2005 Danilak ....................... 711/113
2002/0032835 A1* 3/2002 Li et al. ........................ 711/114
2002/0073298 A1* 6/2002 Geiger et al. ................. 711/206
2003/0128140 A1* 7/2003 Xie et al. ...................... 341/107
2003/0237085 A1 12/2003 Boston et al.
2003/0237086 A1 12/2003 Boston et al.

* cited by examiner

*Primary Examiner* — Kevin Ellis
*Assistant Examiner* — Alan Otto
(74) *Attorney, Agent, or Firm* — Kunzler Needham Massey & Thorpe (57) ABSTRACT

The present invention provides for a method, system, and computer program product for managing the storage of data. Data is selectively compressed based on a pre-defined compression policy and metadata is stored for physical storage blocks. A stored compression policy identifies at least one criterion for compression, and physical blocks of data meeting the compression policy are identified. A physical block is selected as a source block for data compression, and one or more physical locations are selected as target locations. Data is read from the source block, compressed, and written to the target locations. Metadata is updated to indicate a mapping between the target locations and the virtual blocks previously mapped to the source block. Extra storage capacity can be freed up until more physical storage is ordered and installed, while more important data, such as recently or frequently accessed data, is retained in an uncompressed and accessible state.

20 Claims, 5 Drawing Sheets

METHOD, SYSTEM AND COMPUTER PROGRAM PRODUCT FOR MANAGING THE STORAGE OF DATA

FIELD OF THE INVENTION

The present invention relates to the field of data processing and in particular to the management of storage and the migration of data.

BACKGROUND OF THE INVENTION

Enterprises face major storage challenges due to the fast growth of their storage needs, the increased complexity of managing the storage, and the requirement for high availability of storage. Storage Area Network (SAN) technologies enable storage systems to be engineered separately from host computers through the pooling of storage, resulting in improved efficiency.

Storage virtualization, a storage management technology which masks the physical storage complexities from the user, may also be used. Block virtualization (sometimes also called block aggregation) provides servers with a logical view of the physical storage, such as disk drives, solid-state disks, and tape drives, on which data is actually stored. The logical view may comprise a number of virtual storage areas into which the available storage space is divided (or aggregated) without regard to the physical layout of the actual storage. The servers no longer see specific physical targets, but instead see logical volumes which can be for their exclusive use. The servers send their data to the virtual storage areas as if they are their direct-attached property.

Virtualization may take place at the level of volumes, individual files or at the level of blocks that represent specific locations within a disk drive. Block aggregation can be performed within hosts (servers), in the storage network (storage routers, storage controllers), and/or in storage devices (intelligent disk arrays).

Typically, a storage virtualization engine acts as a shared storage interconnect coupled between host data processors and the physical storage media, enabling the host data processors to be maintained "zoned" from the physical storage media. The physical storage media are invisible to the host data processors, which see only the virtual disks presented by the virtualization engine.

The virtualization engine splits the physical storage into chunks, or "extents". Meta-data within the engine tracks the mapping of extents to virtual disks. I/O requests from the host data processors to the virtual disks are directed by the virtualization engine to the corresponding physical data blocks according to its mappings. The host data processors may be those of different vendors and may have different operating systems.

In order to maximize use of the physical storage available a storage manager may be used to migrate data which is deemed to be less important from higher level (expensive and highly redundant) storage to lower level (less expensive and possibly less redundant) storage. To enable this, the virtualization engine may maintain additional metadata for use by the storage manager, such as an access value for each physical data block indicating how often the data block has been accessed recently.

As the use of storage virtualization in SANs continues to increase, it becomes possible to implement overallocation of the available free capacity across multiple storage subsystems (which themselves do not support overallocation). When the virtualization engine creates a virtual disk it informs the host processor that is has created a virtual disk of a certain number of bytes, it gives the host the impression that this amount of physical storage has been allocated to the host. However, in an overallocated environment this may not be the case. When an overallocated virtual disk is created no actual physical capacity is allocated. As data is written to the virtual disk only the required number of extents (at least one) are allocated to the virtual disk. This allows storage to be allocated as it is needed. The primary advantage of such a system is that at any given time, the system only ever uses physical capacity equal to or slightly greater than the amount of data the system is managing. For example, in a non-overallocated environment when a Flash copy (point in time copy) of a virtual disk is made the target virtual disk needs to be the same size as the source. This can be seen as a 'waste' of premium storage. If the target virtual disk is created as an overallocated volume, only the actual 'changed' capacity is ever allocated for the target.

Overallocation does, however, introduce a new problem when the actual physical storage begins to fill up and there is found to be insufficient space allocated to store the new data. Warning levels may be set, typically by a system administrator, such that a warning message is sent when the storage level reaches a warning level, e.g. "Warn me when my physical storage reaches 75% full". However, sometimes this level may be set incorrectly, or the system administrator may not realize how much data their enterprise adds on a daily basis, and thus may be running the risk of running out of free physical storage capacity.

The present invention aims to address this problem.

SUMMARY OF THE INVENTION

A first aspect of the invention provides a method for managing storage of data in a network comprising a plurality of host data processors coupled to a storage virtualization engine, the storage virtualization engine being coupled to a plurality of physical storage media. The method comprises storing metadata for blocks of the physical storage, the metadata identifying mappings to one or more block(s) of a virtual disk presented to a host data processor from a corresponding physical block, storing a compression policy identifying at least one criterion for compression and identifying a set of physical blocks of data which meet the compression policy. Then, a physical block is selected, from this set of blocks, as a source block for data compression, and one or more physical location(s) to which the compressed data is to be written is(are) selected as the target location(s). Data is then read from the source block, compressed, and then written to the target location(s). The metadata is then updated to indicate a mapping between the target location(s) and the virtual block(s) previously mapped to the source block.

A second aspect of the invention provides a storage virtualization engine for use in a network comprising a plurality of host data processors operable to communicate with the virtualization engine. The virtualization engine is operable to communicate with a plurality of physical storage media, present at least one virtual disk to a host data processor, and receive I/O requests to the at least one virtual disk from the host data processor. The virtualization engine comprises metadata for blocks of the physical storage including data identifying mappings between each block of physical storage to one or more corresponding virtual block(s) of said at least one virtual disk, a compression policy identifying at least one criterion for compression; and a storage manager. The storage manager selects a set of physical blocks of data which meet the compression policy, selects a physical block from the identified set of blocks as a source block for data compression, and selects one or more physical target location(s) to which the compressed data is to be written. Then it reads and compresses data from the source block, writes the compressed data to the target location(s) and updates the metadata to indicate a mapping between the target location(s) and the virtual block(s) previously mapped to the source block.

A third aspect of the invention provides a system for managing storage of data on a plurality of physical storage media, the system comprising a plurality of host data processors coupled to a storage virtualization engine as described above.

Further aspects of the invention provide a computer program element comprising program code operable to implement the method described above, as well as such as computer program element on a carrier medium.

Embodiments of the present invention can be used in emergency situations to free up extra storage. Blocks of data are found that meet some pre-defined policy, (such as not recently accessed, 'written once/never read' etc.), are compressed and written back in compressed form to free some extra capacity while more physical storage is being ordered and installed. Thus a stop gap which temporarily frees up some space while additional storage is being provisioned is achieved, while retaining the most important data (e.g., data which has been accessed recently or frequently) in an uncompressed state, and thus quickly accessible.

DETAILED DESCRIPTION OF THE INVENTION

Figure 1:
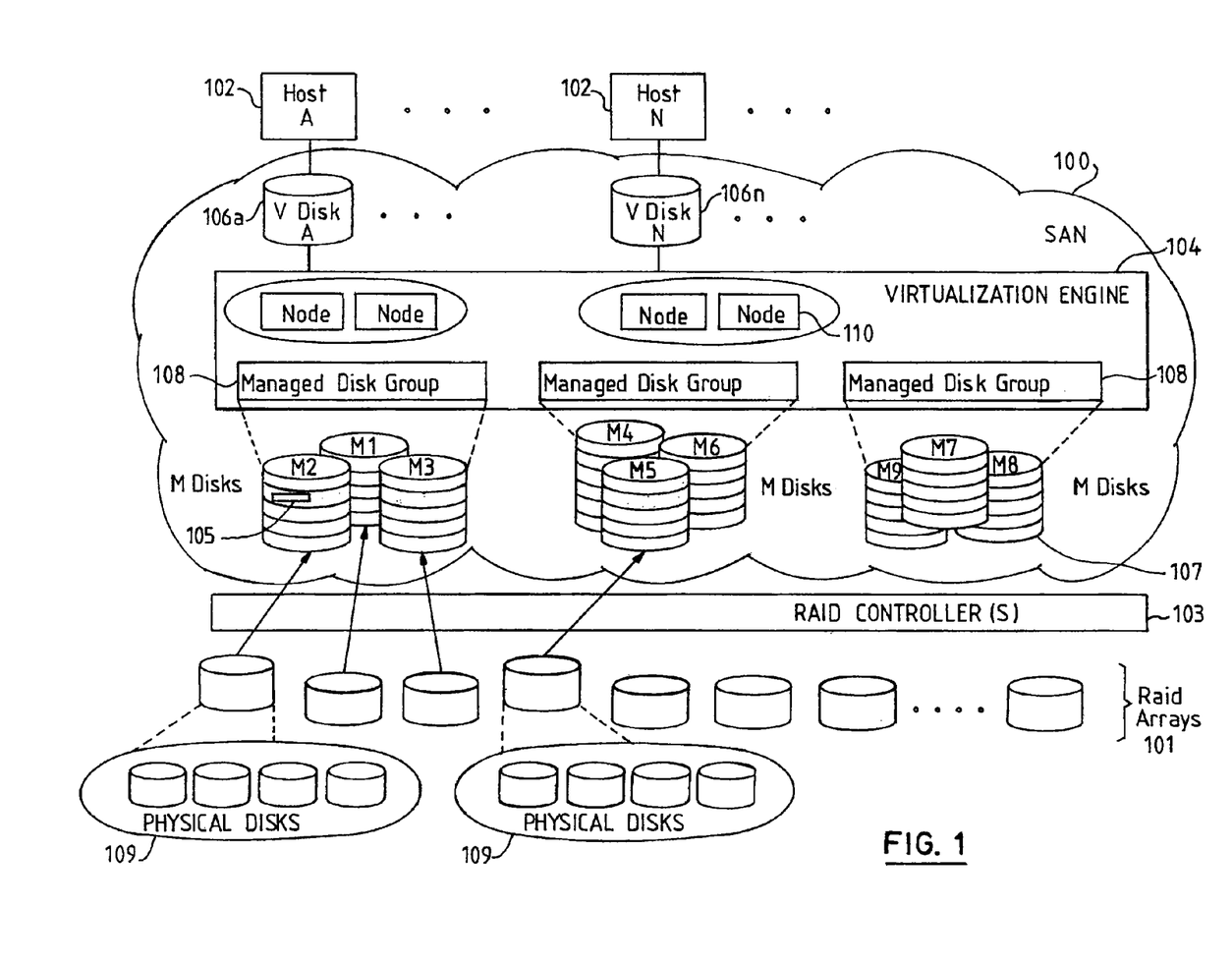
FIG. 1 illustrates an example of a Storage Area Network in which the present invention may be implemented.

Referring to FIG. 1, there is shown a SAN 100 which has several host application servers 102 attached. These can be of many different types, typically some number of enterprise servers, and some number of user workstations.

Also attached to the SAN, (via Redundant Array of Inexpensive Disks (RAID) controllers 103), are various levels of physical storage 109. For example, enterprise level storage, such as the IBM® Enterprise Storage Server® (ESS); midrange storage, such as the IBM Fibre Array Storage Technology™ (FAStT); and lower-end storage, such as the IBM FAStT Serial Advanced Technology Attachment (SATA).

The SAN is virtualized by means of a storage virtualization engine 104 which sits in the data path for all SAN data, and presents Virtual Disks 106a to 106n to the host servers and workstations 102. These virtual disks are made up from the capacity provided across a plurality of storage devices 109.

The virtualization engine 104 comprises one or more nodes 110 (four shown), which provide virtualization, cache and copy services to the hosts. Typically, the nodes are deployed in pairs and make up a cluster of nodes, with each pair of nodes known as an Input/Output (I/O) group.

As storage is attached to the SAN it is added to various pools of storage each controlled by a RAID controller 103. Each RAID controller presents an SCSI (Small Computer System Interface) disk to the virtualization engine. The presented disk may be managed by the virtualization engine, and be called a managed disk, or MDisk 107. These MDisks are split into extents 105, fixed size blocks of usable capacity, which are numbered sequentially from the start to the end of each MDisk. These extents can then be concatenated, striped, or any desirable algorithm can be used to produce larger virtual disks (VDisks) which are presented to the hosts by the nodes.

The MDisks M1, M2, ... M9 can be grouped together in Managed Disk Groups or MDGs 108, typically characterized by factors such as performance, RAID level, reliability, vendor, and so on.

Figure 2:
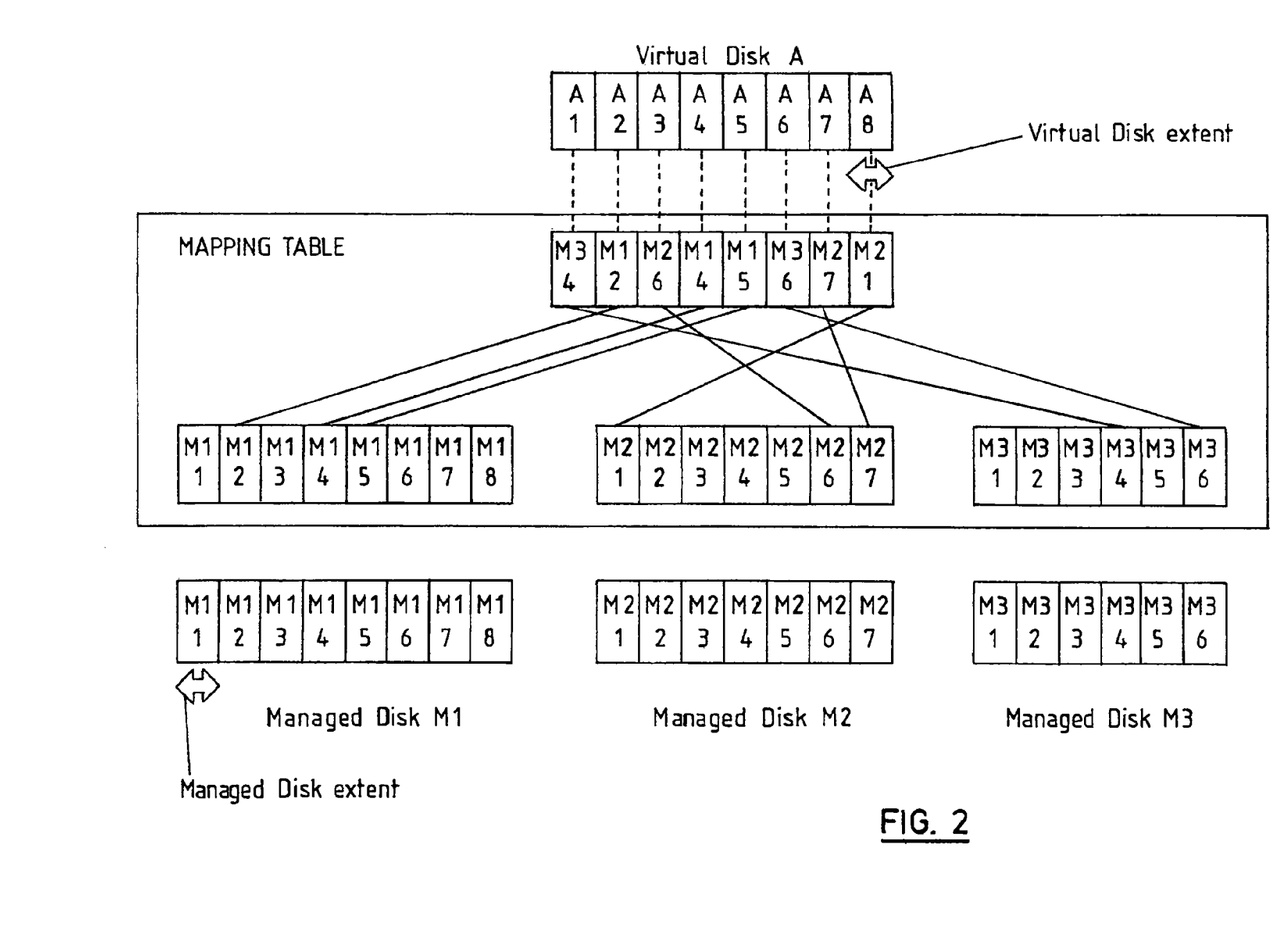
FIG. 2 illustrates a simple view of block virtualization.

The virtualization engine converts Logical Block Addresses (LBAs) of a virtual disk to extents of the VDisk, and maps extents of the VDisk to MDisk extents. An example of the mapping from a VDisk to MDisks is shown in FIG. 2. Each of the extents of the VDisk is mapped to an extent of one of the managed disks M1, M2, or M3. The mapping table, which can be created from metadata stored by each node, shows that some of the managed disk extents are unused. These unused extents are available for use in creating new VDisks, migration, expansion and so on.

Typically, virtual disks are created and distributed so that the enterprise level servers use enterprise level storage, and so on.

Figure 3:
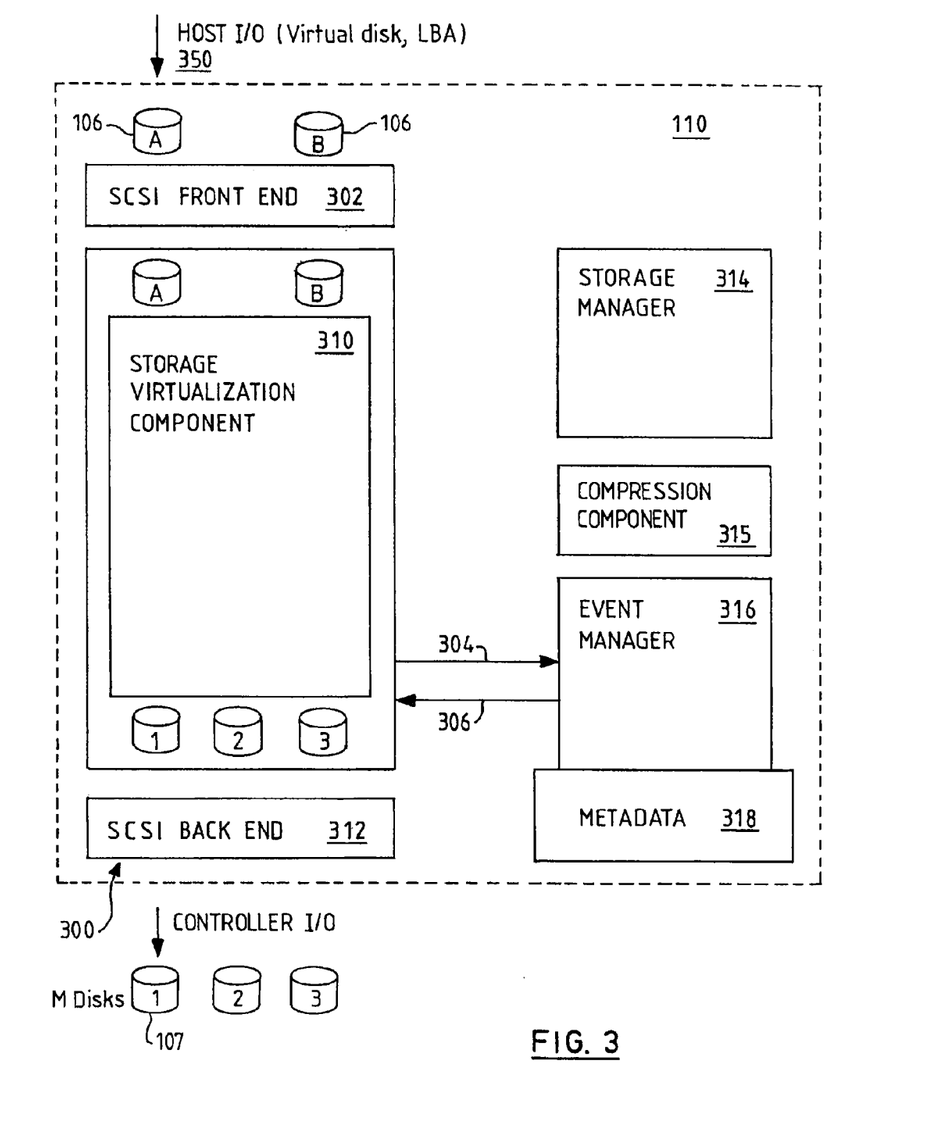
FIG. 3 illustrates components of a virtualization engine according to an embodiment of the invention.

An I/O flow will now be described with reference to FIG. 3. As shown in FIG. 3, a virtualization engine or node 110 comprises the following modules: SCSI Front End 302, Storage Virtualization 310, SCSI Back End 312, Storage Manager 314, and Event Manager 316.

The SCSI Front End layer receives I/O requests from hosts; conducts LUN mapping (i.e. between LBAs to Logical Unit Numbers (LUNs) (or extents) of virtual disks A and B); and converts SCSI Read and Write commands into the node's internal format.

The Storage Virtualization layer is responsible for mapping between Virtual Disks A and B and Managed Disks 1, 2, and 3 and for performing data migration. Extent information is held as metadata 318 by the Virtualization layer. This metadata can also comprise other information about each extent, such as an access value representing the number of reads/writes or frequency of accesses made to the extent. The metadata is also available to the storage manager 314.

The SCSI Back End processes requests to Managed disks which are sent to it by the Virtualization layer above, and addresses commands to the RAID controllers.

The I/O stack may also include other modules (not shown), such as Remote Copy, Flash Copy, and Cache.

The node displayed in FIG. 3 belongs to an I/O group to which Virtual Disks A and B are assigned. This means that this node presents an interface to Virtual Disks A and B for hosts. Managed disks 1, 2, and 3 may also correspond to other virtual disks assigned to other nodes.

The event manager 316 manages the persistence and synchronization of the metadata 318, which comprises non-volatile information about the stored data, required by the virtualization engine(s).

The compression process of the preferred embodiment may be run as a background task inside the virtualization engine using the existing migration algorithms and extent mapping functions, with the addition of a compression component 315, which may be either a software-based compression algorithm or a hardware-based compression engine (for faster compression/decompression). The policy set by the user before triggering the compression process defines how much space should be freed and how much processing power to dedicate to the process.

The storage manager 314 monitors the use of physical extents and may use many different factors to determine an access value of a particular extent, such as date last accessed, number of times accessed during a recent time period; the type of recent accesses (e.g. read or write). It uses the metadata to ascertain such details. The system administrator can set up the classification of "recent" when the system is set up.

Figure 4:
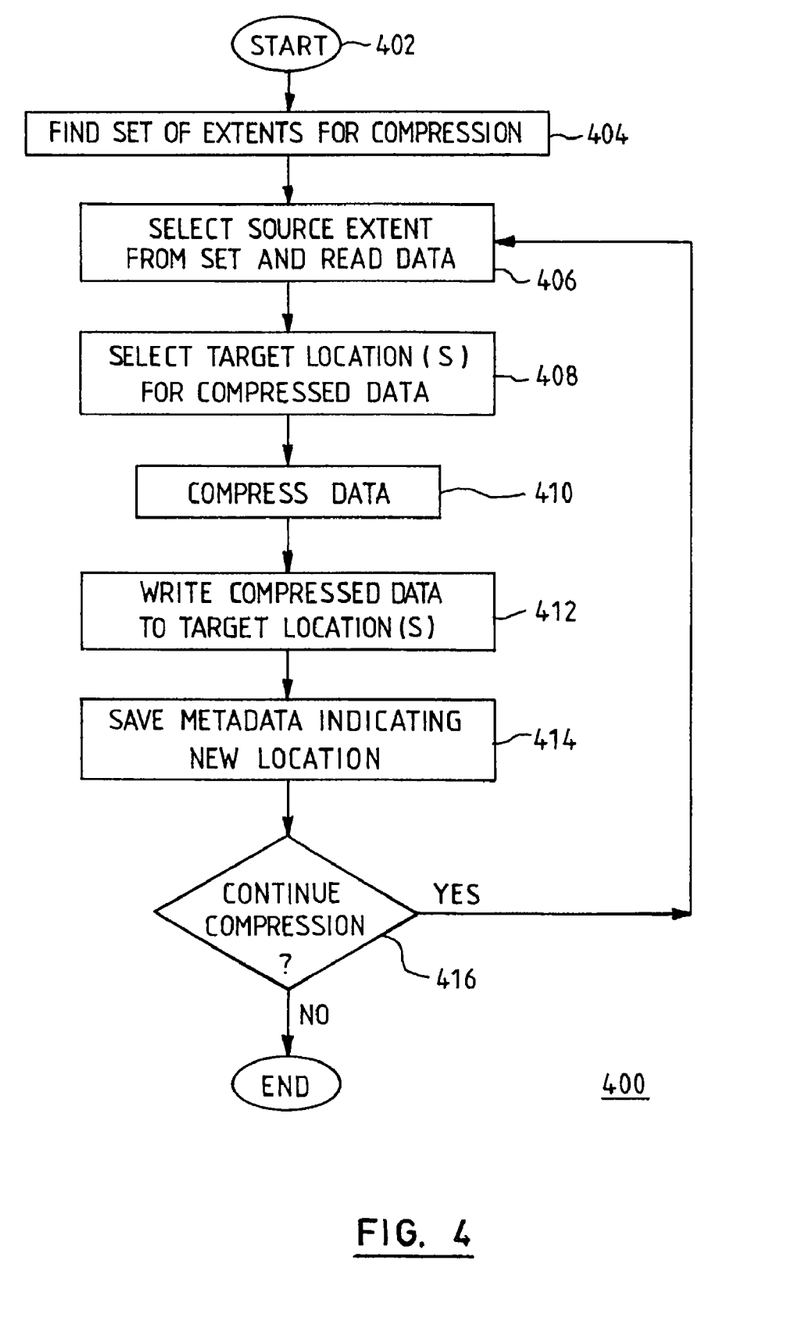
FIG. 4 illustrates a flowchart of a method of compressing and migrating data according to a preferred embodiment.

The method of the preferred embodiment will now be described with reference to FIG. 4. The method 400 is initiated 402 upon the discovery that the system is about to run out of physical storage. The system administrator may have set up storage usage warning levels, which when reached initiate the method. The system administrator may also provide a compression policy which sets out criteria to be used in the selection of extents for compression.

The storage manager conducts 404 a search for extents that meet one or more of the criteria specified in the compression policy. These criteria may be time since last access (e.g. not accessed for at least 30 days), frequency of access (e.g. number of times read) etc. As extents are found meeting the policy they are added to a list which identifies the set of extents available for compression.

Next, the data from an extent selected from this set of extents is read off disk 406, and a high compression algorithm is performed 408 against this data. Any known prior art compression algorithm may be used. The storage manager selects one or more free storage location(s) 410 for storage of the compressed data, which is then written 412 to those target locations. Once the data has been compressed and written to the target extent(s) the event manager is notified that the move has been successful and the metadata for the virtual disk mapping is updated to indicate the new status (compressed) and location of the data. The selected source extent is then marked as free space (the data may remain until the extent is written to, or may be deleted from the extent).

A decision as to whether to continue the compression method is next made 416 in dependence on the compression policy. Typically, steps 406 to 414 are repeated until a sufficient number of extents have been freed up to allow efficient writing of new data.

Figure 5:
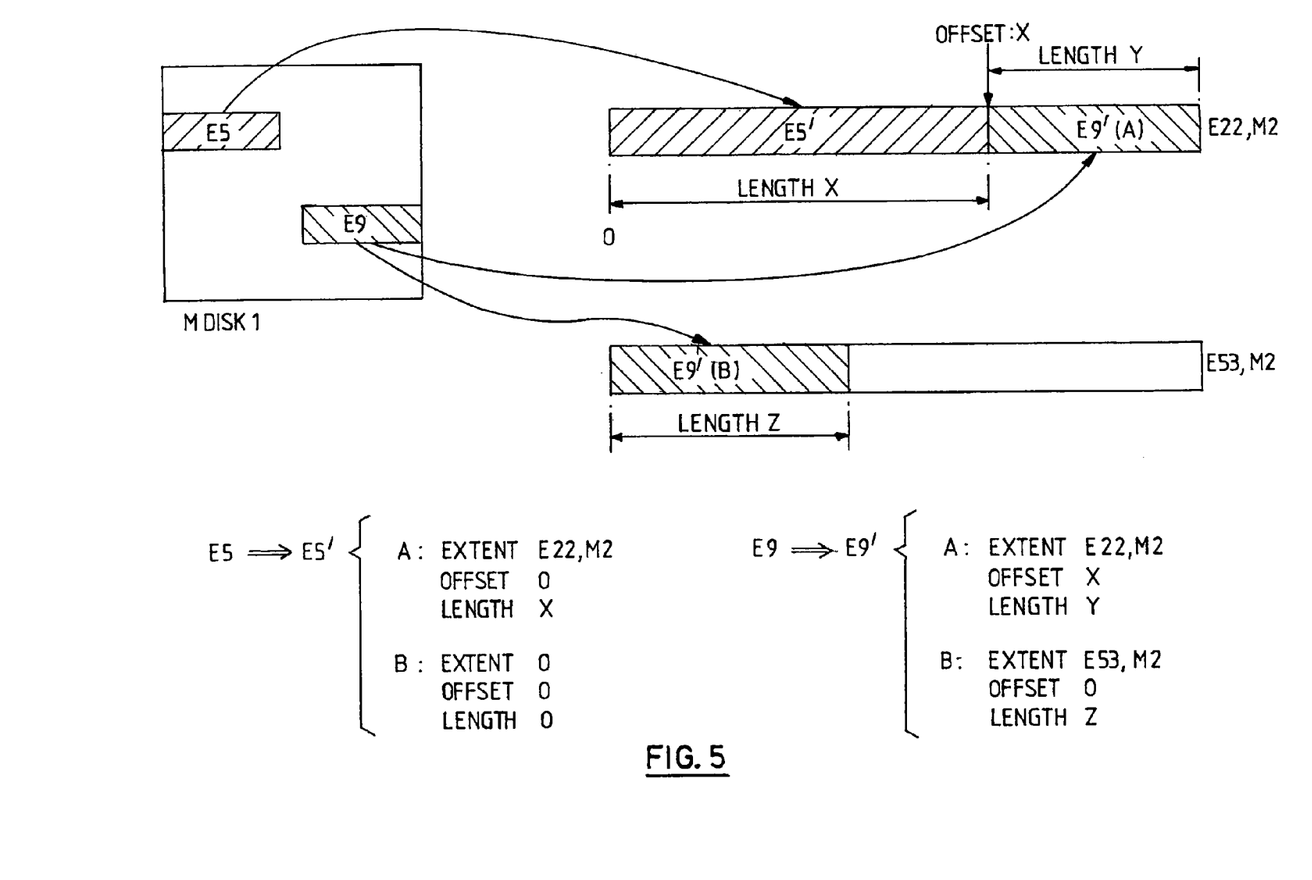
FIG. 5 illustrates an example of metadata recorded with the compression of two extents of data according to the method of FIG. 4.

As the method involves the compression of data, a compressed chunk of data may not always be written on an extent boundary, and may often be split into two segments. Thus, the definition of the location of a compressed chunk of data is more complicated, as will be explained with reference to the example illustrated by FIG. 5. This shows a managed disk, MDisk1, which has two extents, E5 and E9, which have been selected for compression. Free extents E22 and E53 of another managed disk MDisk2 (not shown) have been selected as target extents to which compressed data is to be written. The data from extent E5 is read off and compressed. It is then written (E5') to E22. Due to a reduction in the size of the data from its uncompressed state, the compressed data does not fill a whole extent—it fills up just 'X' bytes of E22, so there is a portion of E22 which is still free space. When data from the next extent selected for compression, E9, is read off and compressed, part of the compressed data is written to the free space of E22, and a second segment of the compressed data is written at the start of the next target extent, E53. The first segment (part A) of E9 has a length of Y bytes and is written at an offset of X bytes from the beginning of target extent E22. The second segment (part B) has a length of Z bytes and an offset of zero bytes from the beginning of target extent E53. Thus the virtualization metadata describing the location of a compressed extent of data may include the target extent, offset and length of each segment of compressed data. As shown in FIG. 5, target extent E53 has some remaining free space available for the writing of one or more segments of compressed data, starting at an offset of Z.

Suppose the data from a single extent takes up only 66% of the extent after compression, then three extents can be grouped together, and written as two new extents of compressed data to the physical storage. So the overall result of the compression of three extents means that there is one extra extent available for the storage of new data. These steps can be repeated until a required amount of storage has been freed up, or until all extents found to match the compression policy/criteria have been compressed. Clearly, the actual amount of physical capacity which is reclaimed depends on the efficiency of the compression algorithm.

Once the user has installed some more physical storage, the reverse processing can be triggered to decompress the data back to full sized extents writing to the new storage medium. In the meantime, if a request to access one of the compressed extents is received, the compressed data must be decompressed during processing of the request. A decision as to whether or not the requested data should be recompressed is then made as the access to the data may mean that the data no longer fulfils the requirements of the compression policy.

The processing of an I/O request 350 from a host will now be explained with reference to FIG. 3. The request includes the ID of the virtual disk and LBA to which the request refers. If the I/O request reaches the virtualization component 310, that is the requested data is not found in the cache, the virtualization component 310 uses metadata 318 to map the ID of the virtual disk and LBA to one or more managed disk extents, or to one or more compressed data segments of extents of one or more managed disks. These are then read into user memory (not shown) during the I/O processing.

If the I/O request is a read to one or more compressed data segments, the data from these locations is first combined and decompressed. The read data is then passed back through the system to the requesting host.

If the I/O request is a write to a compressed extent, now stored as one or more compressed data segments, the new write data has to be inserted at the correct location within the uncompressed extent data (the actual write may be smaller than the extent size). Therefore, the compressed segments have to be read, combined, and decompressed, the new data merged into the uncompressed extent and the compression policy checked. If the policy dictates that a write to a compressed extent should not be recompressed, the entire uncompressed extent is written back to a new uncompressed extent. Otherwise the extent needs to be recompressed and written back, either to the old location (if there is sufficient space) or to a new location and the appropriate metadata updated.

The virtualization layer informs 304 the storage manager of the I/O request and the storage manager updates the metadata in respect of the affected extent, including updating an access value for the extent. The time at which the I/O occurred may be stored as the access value, or a count value may be reset/updated. If the compression process is still active, the data manager may then choose to compress the data again (if it was written back as uncompressed) or to decompress the data due to the policy/access characteristic changes resulting from this I/O request.

As compression algorithms have an element of randomness in their outcomes, some extents may be compressed by a good percentage, and some may not compress at all—it is even possible that they may be larger after compression. Thus the process 404 of selecting extents for compression may include a step of verifying the data compression ratio (uncompressed size/compressed size) produced by the data compression algorithm for each extent. Then, a given extent may be selected for compression and migration only if its data compression ratio exceeds a particular threshold.

This verification mechanism may be implemented as a background task, which has a single extent allocated thereto, and which searches for extents that are suitable for compression. The task tests each extent by compressing its data and writing the compressed data to the task's extent. If the data is smaller after compression its data compression ratio is greater than 1, and so the task sets a flag against the tested extent so that it is a known 'good' compression extent. Otherwise, it does not set the flag. Using this technique, when the user turns on compression, the set of 'good' compressible extents is already known and can be found simply by checking this flag for each extent. Typically, this flag will be used by the storage manager in conjunction with metadata identifying the recent access history of each extent in order to select a set of extents for compression, according to the compression policy. Of course, the task may use another threshold level for the compression ratio in order to determine whether or not to set the flag.

Additionally, the system may be provided with a plurality of different compression algorithms, and the process may include a step of selecting a particular data compression algorithm to use. For example, a particular data compression algorithm may be selected according to the type of data stored in an extent, which may be specified in the metadata for that extent.

In this way, extra storage capacity can be freed up until more physical storage is ordered and installed, whilst retaining more important data (e.g. data which has been accessed recently or frequently) in an uncompressed state and thus most readily accessible.

It will be clear to one skilled in the art that the method of the present invention may suitably be embodied in a logic apparatus comprising logic means to perform the steps of the method and that such logic means may comprise hardware components or firmware components.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisioned as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave, or optical carrier wave. Such carrier media are also envisioned as aspects of the present invention.

It will be understood by those skilled in the art that, although the present invention has been described in relation to the preceding example embodiments, the invention is not limited thereto and that there are many possible variations and modifications which fall within the scope of the invention.

What is claimed is:

1. A method for managing storage of data in a network, comprising:
   providing a plurality of host data processors coupled to a storage virtualization engine, the storage virtualization engine being coupled to a plurality of physical storage media;
   storing metadata for physical blocks of the physical storage, the metadata identifying mappings to one or more virtual blocks of a virtual disk presented to a host data processor from a corresponding physical block;
   identifying a set of physical blocks of data which meet a compression policy that specifies that for every write of first data to a first physical block storing a compressed instance of the first data in the first physical block, the written first data is not recompressed;
   selecting a second physical block from the identified set of physical blocks as a source block for data compression;
   selecting target locations meeting the compression policy to which the compressed data is to be written;
   reading and compressing data from the source block;
   writing the compressed data to the target locations; and
   updating the metadata to indicate a mapping between the target locations and the virtual blocks previously mapped from the source block.

2. A method according to claim 1, wherein the storage virtualization engine is coupled to one or more storage controllers which presents data stored on the physical storage media to the virtualization engine as a plurality of managed disks, and wherein the updated metadata comprises a mapping between the virtual blocks of the virtual disk and one or more compressed data segments of physical blocks of one or more managed disks.

3. A method according to claim 1, further comprising splitting the compressed data into a plurality of segments and writing each segment to a different target location.

4. A method according to claim 3, wherein updating the metadata comprises storing offset, length, and managed disk block data for each segment.

5. A method according to claim 3, further comprising recombining the split compressed data to allow the data to be decompressed.

6. A method according to claim 1, wherein the metadata includes data identifying an access value for each physical block, the access value used by the compression policy during the step of identifying the set of physical blocks which meet the compression policy.

7. A method according to claim 1, further comprising the step of comparing the data compression ratio of the first physical block to a particular threshold.

8. A method according to claim 7, further comprising setting a flag in the metadata for the first physical block based on the result of said comparison.

9. A method according to claim 1, further comprising checking whether a compression flag in the metadata is set for each physical block during the step of identifying the set of physical blocks which meet the compression policy.

10. A method according to claim 1, further comprising decompressing the compressed data when more physical storage is available to the storage virtualization engine.

11. A storage virtualization engine for use in a network, comprising:
    a storage device storing computer program code executable by a processor, the computer program code comprising:
    metadata for physical blocks of the physical storage, including data identifying mappings between each physical block to one or more corresponding virtual blocks of at least one virtual disk;

a compression policy that specifies that for every write of first data to a first physical block storing a compressed instance of the first data in the first physical block, the written first data is not recompressed; and a storage manager, wherein the storage manager performs the actions of:
 identifying a set of physical blocks of data which meet the compression policy;
 selecting a second physical block from the identified set of blocks as a source block for data compression;
 selecting one or more physical target location(s) meeting the compression policy to which the compressed data is to be written;
 reading and compressing data from the source block;
 writing the compressed data to the target location(s); and
 updating the metadata to indicate a mapping between the target location(s) and the virtual block(s) previously mapped from the source block;

wherein a plurality of host data processors is operable to communicate with the virtualization engine; and wherein the virtualization engine is operable to communicate with a plurality of physical storage media, present the at least one virtual disk to a host data processor, and receive I/O requests to the at least one virtual disk from the host data processor.

12. A storage virtualization engine according to claim 11, coupled to one or more storage controllers which present data stored on the physical storage media to the virtualization engine as a plurality of managed disks.

13. A storage virtualization engine according to claim 12, wherein the updated metadata comprises a mapping between a virtual block of the at least one virtual disk and one or more compressed data segments of physical blocks of the plurality of managed disks.

14. A storage virtualization engine according to claim 13, the metadata identifying the offset, length and managed disk block of each stored segment.

15. A storage virtualization engine according to claim 11, further comprising an event manager for monitoring I/O requests and updating the metadata for physical blocks of the physical storage to identify an access value for each block.

16. A storage virtualization engine according to claim 11, further comprising a compression component for determining the data compression ratio of a physical block of a physical target location and comparing the ratio to a particular threshold.

17. A storage virtualization engine according to claim 16, wherein the compression component is operable to set a flag in the metadata for the physical block of the physical target location in dependence on the result of the comparison.

18. A storage virtualization engine according to claim 16, wherein the compression component selects a particular data compression algorithm for the physical block of the physical target location in dependence on the metadata for the physical block of the physical target location.

19. A system, comprising:
a storage virtualization engine for use in a network comprising a storage device storing computer program code executable by a processor;
a plurality of host data processors to communicating with the virtualization engine;
wherein the storage virtualization engine communicates with a plurality of physical storage media, presents at least one virtual disk to a host data processor, and receives I/O requests to the at least one virtual disk from the host data processor; and
wherein the storage virtualization engine comprises:
 metadata for physical blocks of the physical storage, including data identifying mappings between each physical block to one or more corresponding virtual blocks of at least one virtual disk;
 a compression policy that specifies that for every write of first data to a first physical block storing a compressed instance of the first data in the first physical block, the written first data is not recompressed; and
 a storage manager, wherein the storage manager performs the actions of:
  identifying a set of physical blocks of data which meet the compression policy;
  selecting a second physical block from the identified set of blocks as a source block for data compression;
  selecting one or more physical target location(s) meeting the compression policy to which the compressed data is to be written;
  reading and compressing data from the source block;
  writing the compressed data to the target location(s); and
  updating the metadata to indicate a mapping between the target location(s) and the virtual block(s) previously mapped from the source block.

20. A computer program product comprising a tangible computer useable storage medium storing a computer readable program, wherein the computer readable program when executed on a computer causes the computer to:
 store metadata for physical blocks of the physical storage, the metadata identifying mappings to one or more virtual blocks of a virtual disk presented to a host data processor from a corresponding physical block;
 identify a set of physical blocks of data which meet a compression policy that specifies that for every write of first data to a first physical block storing a compressed instance of the first data in the first physical block, the written first data is not recompressed;
 select a second physical block from the identified set of blocks as a source block for data compression;
 select target locations meeting the compression policy to which the compressed data is to be written;
 read and compress data from the source block;
 write the compressed data to the target locations; and
 update the metadata to indicate a mapping between the target locations and the virtual blocks previously mapped from the source block.

* * * * *